May 3, 1932. S. J. GARDNER 1,856,476
TRAVELING RIPSAW MACHINE
Filed Dec. 5, 1931
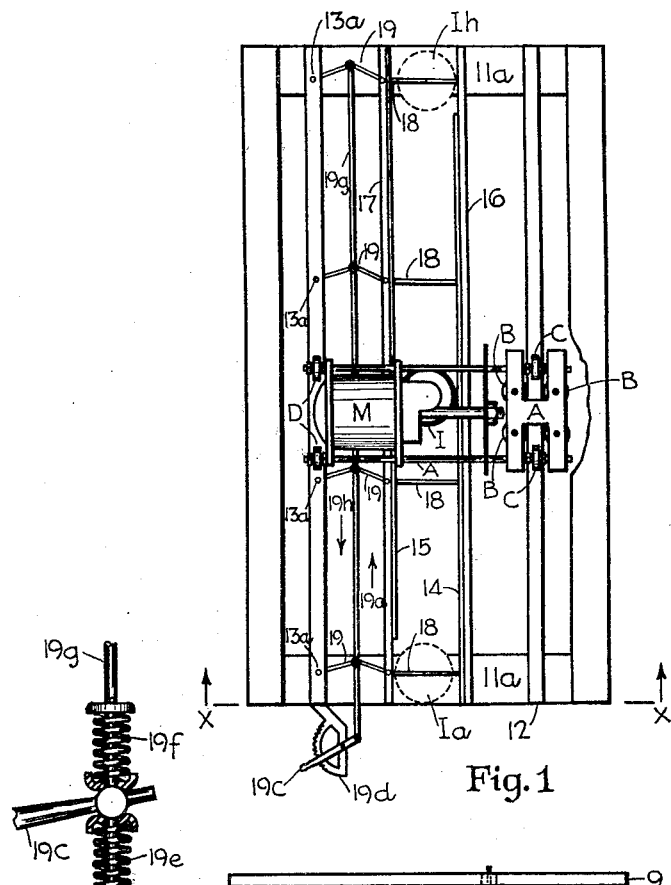
Fig. 1
Fig. 3
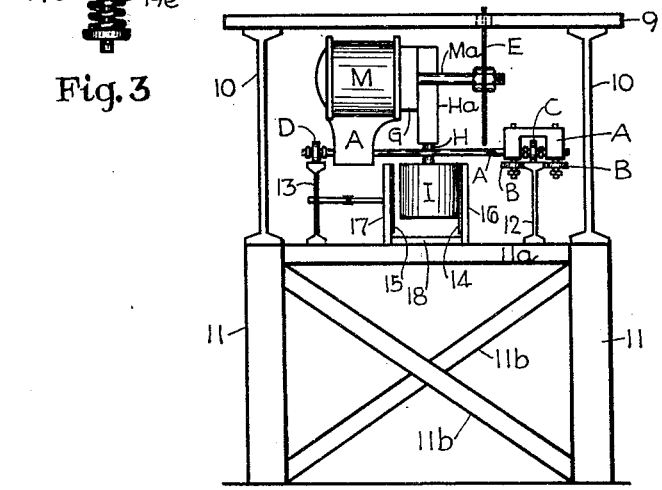
Fig. 2
INVENTOR.
Stonewall J. Gardner
BY John L. Milton.
ATTORNEY.

Patented May 3, 1932

1,856,476

UNITED STATES PATENT OFFICE

STONEWALL J. GARDNER, OF NEW ALBANY, INDIANA

TRAVELING RIPSAW MACHINE

Application filed December 5, 1931. Serial No. 579,148.

This invention relates to a traveling rip saw machine organized to fabricate lumber to a set line.

The object of this invention is to produce a machine that will be efficient from the standpoint of power required, space occupied, manual attention and cost of production, to which end the invention consists in the combined arrangement of parts hereinafter described and claimed, the main characteristic of the same being that the motor provided for driving the cutter also operates or propels the carrage in which it is mounted on tracks, the motor propels the carriage through a rotating member connected to the motor shaft through the medium of gearing, the rotating member is so disposed that it can make contact with one or two normally stationary surfaces, either one of which may be selected by the operator to propel the carriage and all of its appurtenances from one selected location to a distant location.

Reference is made to the accompanying drawings to assist in the complete understanding of the invention in which:

Figure 1 is a plan view of the machine with the work table omitted. Fig. 2 is an end view of Fig. 1 along the lines X, X. Fig. 3 is a detailed plan view of an auxiliary toggle tensioning device not shown in the general view, Fig. 1.

9 represents a work table top which is carried on major I beams 10, 10 which are disposed on vertical supports 11, 11, tied together with horizontal bars 11a and diagonal ones 11b. Minor beams or tracks 12, 13 are carried on the table structure and are horizontally disposed so that a taveling saw carriage A may freely operate on same. The carriage is equipped with rollers B, B, C, C, D, D. The vertical ones C, C, and D, D, are arranged to carry the gravity load and B, B are so disposed as to prevent the carriage from lateral horizontal movement during its course of travel from one end of the track to the other. The saw carriage is provided with a motor M, on extended shaft Ma of which is the saw E which is to project above the top surface of the work table in the conventional manner. Motor shaft Ma also carries a spiral or worm gearing disposed in a housing G which is attached to the motor frame in the conventional way. On the vertical shaft H of this gearing, which is supported by bearing Ha is mounted a drum I on which is attached a suitable friction surface, the whole functioning to propel the carriage in both directions by making contact with either of the friction surfaces 14 or 15 which are vertically disposed and supported by parallel strips 16, 17. Friction strips 14 and 15 are staggered, i. e. 14 extends beyond 15 at one end while 15 extends beyond 14 at the other end. Strips 16 and 17 are rigidly tied together by cross members 18 so as to form a friction box structure that may be horizontally moved by the toggles 19, 19, the dead ends of same being attached to beam 13 by pivot 13a. These toggles are so disposed and operated that they will move the friction box horizontally on cross members 11a for engagement with drum I, according to the position of lever 19c which is arranged to be lodged on the sector 19d for either position. The means of operating the rod 19g can be varied to meet specific conditions. A pair of treadles arranged for manipulation by foot power, applied by the operator, has been successfully employed.

Ia indicates the position of friction drum I at the beginning of the operation which means that the motor carriage will be at the near end of the work table. With the motor running, the carriage will remain in this position until the toggles 19 are forced in the direction of arrow 19a by rod 19g which will bring friction surface 14 into contact with revolving drum I. This puts the carriage in motion and causes it to travel the path determined by the rail 12 throughout the length of the apparatus and the cutter will operate on the board disposed on the work table until the cut is completed and it passes out of engagement with the said friction surface and the drum will then occupy the position indicated by Ih and therefore the carriage will be at rest at the far end of the table with motor and cutter rotating. When the toggles are operated in the direction of 19h friction surface 15 will be brought into contact with drum I and the return of the carriage will immediately start and continue until drum I has reached substantially the location shown by Ia. Springs 19e and 19f are provided to yieldingly hold friction surfaces 14 and 15 adjacent drum I.

To those skilled in the art there are many applications, modifications and variations without departing from the spirit of this invention, therefore, I wish to be limited only by the appended claims.

I claim:

1. An apparatus for reciprocating a carriage consisting of a rotating element carried by said carriage and disposed to alternately engage the surface of one of two movable yielding normally stationary parallel members and propel said carriage through said engagements.

2. An apparatus for reciprocating a carriage mounted on rails consisting of a rotating element carried by said carriage and disposed to alternately engage the surface of one of two movable yielding normally stationary parallel members and propel said carriage through said engagements.

3. An apparatus for reciprocating a carriage mounted on rails consisting of a rotating element carried by said carriage and disposed to alternately engage the surface of one of two movable yielding normally stationary parallel members and propel said carriage in one direction or the other according to the surface engaged.

4. An apparatus for reciprocating a carriage consisting of a rotating element carried by said carriage and disposed to alternately engage the surface of one of two staggered movable yielding normally stationary parallel members and propel said carriage in both directions through said engagements.

5. An apparatus for reciprocating a carriage mounted on rails consisting of an element rotating in one direction and carried by said carriage and disposed to engage one of two movable staggered parallel members and propel said carriage through said engagement to a location beyond engagement with said first member and then lodged for engagement with the other movable member to effect a reverse movement of said carriage.

6. An apparatus for reciprocating a carriage mounted on rails consisting of a rotating element carried by said carriage and disposed to engage one of two movable staggered parallel members and propel said carriage through said engagement to a location beyond engagement with said first member and then lodged for engagement with the other movable member to effect a reverse movement of said carriage.

7. An apparatus for reciprocating a carriage mounted on rails carried on a bed consisting of a continuously rotating element carried by said carriage and disposed to alternately engage the surface of one of two staggered normally stationary parallel members carried on said bed and automatically propel said carriage in both directions through said engagements in combination with means for actuating the automatic propelling means.

8. An apparatus for reciprocating a carriage mounted on rails consisting of a continuously rotating element carried by said carriage and disposed to alternately engage the surface of one of two staggered movable yielding normally stationary parallel members and automatically propel said carriage in both directions through said engagements in combination with means for actuating the automatic propelling means for each direction of movement.

9. An apparatus for reciprocating a carriage mounted on rails carried on a bed consisting of a continuously rotating element carried by said carriage and disposed to alternately engage the surface of one of two staggered movable yielding normally stationary parallel members carried on said bed and automatically propel said carriage in both directions through said engagements in combination with means for actuating the automatic propelling means for each direction of movement.

10. An apparatus for shaping material by means of a rotating cutter mounted on a carriage arranged to travel on a rail in combination with a motor mounted on said carriage which actuates said cutter and propels said carriage through the medium of a rotating friction element carried and actuated by said motor, said rotating element engaging a yielding normally stationary surface which is arranged to be brought into engagement with said rotating element.

11. In an apparatus for shaping material, the combination of means for propelling a cutter mounted on a carriage arranged to travel on a rail in combination with a motor mounted on said carriage which actuates said cutter and propels said carriage in a predetermined course with reference to said material from an initial to an objective location; means for reversely propelling said cutter via the same course to the initial location through the medium of a rotating friction element rigid in terms of and actuated by said motor, said rotating element engaging a normally stationary yielding independent surface which is arranged to be brought into contact engagement with said rotating element.

12. In an apparatus for shaping material, the combination of manual means for propelling a cutter mounted on a carriage arranged to travel on a rail in combination with a motor mounted on said carriage which actuates said cutter and propels said carriage in a predetermined course with reference to said material from an initial to an objective location; means for reversely propelling said cutter via the same course to the initial location through the medium of a rotating friction element rigid in terms of and actuated by said motor, said rotating element engaging a normally stationary yielding independent surface throughout the length of its travel which is arranged to be brought into engagement with said rotating element.

13. An apparatus for cutting material to a desired surface comprising a bed constructed with rigid supporting members, a work supporting table surface and a pair of tracks, in combination with a motor equipped carriage, said motor being adapted to operate a cutting element and propel said carriage through the medium of a rotating friction element carried by said carriage and actuated by said motor, said rotating element engaging a yielding surface carried by said bed, said surface being arranged to be brought into engagement with said rotating element.

14. An apparatus for cutting a sheet of material to a desired line comprising a bed constructed with rigid supporting members, a work supporting table and a pair of tracks, in combination with a motor equipped carriage, said motor being adapted to operate a cutting element and propel said carriage through the medium of a rotating friction element attached to and actuated by said motor, said rotating element engaging a yielding surface carried by said bed, said surface being arranged to be brought into engagement with said rotating element.

In testimony whereof I affix my signature.

STONEWALL J. GARDNER.